United States Patent [19]

Yamamoto et al.

[11] Patent Number: 4,623,571
[45] Date of Patent: Nov. 18, 1986

[54] CUSHIONING MEMBER

[75] Inventors: Ryuzo Yamamoto, Suita; Kihei Mori, Ibaraki; Yorihiko Omoto, Kashiwara; Hidehito Iai, Nara; Toru Kikuchi, Yokohama, all of Japan

[73] Assignee: Teijin Limited, Osaka, Japan

[21] Appl. No.: 717,513

[22] Filed: Mar. 29, 1985

[30] Foreign Application Priority Data

Feb. 4, 1985 [JP] Japan .................................. 60-18610

[51] Int. Cl.$^4$ ............................................... B32B 1/04
[52] U.S. Cl. .......................................... 428/68; 5/459; 428/234; 428/246; 428/247; 428/280; 428/282; 428/284; 428/286; 428/287; 428/300; 428/340; 428/423.1; 428/920
[58] Field of Search ............... 428/280, 282, 284, 286, 428/287, 300, 920, 921, 246, 68, 234, 247, 340, 423.1; 5/459; 297/DIG. 5

[56] References Cited

U.S. PATENT DOCUMENTS 4,463,465  8/1984  Parker et al. ...................... 428/287

Primary Examiner—James J. Bell
Attorney, Agent, or Firm—Burgess, Ryan & Wayne

[57] ABSTRACT

A cushioning member comprising a cushioning layer, a heat insulating layer, and a dress covering is provided. The heat insulating layer is a laminate comprising (A) a flame-proofing layer and (B) a reinforcing layer, wherein the mainfibers of the flame-proofing layer (A) have a melting point of at least 300° C., a specific gravity not higher than 1.6 g/cm$^3$, and a limiting oxygen index (LOI) of at least 33 and the main fibers of the reinforcing layer (B) have a limiting oxygen index (LOI) smaller than 33 but not smaller than 25, a specific gravity not higher than 1.6 g/cm$^3$, a tensile strength of at least 3.2 g/d, and a toxicity test value of at least 10.

The cushioning member has a light weight and an easy moldability and also has heat insulating and flame-proofing characteristics capable of satisfying the fireproof regulations of the Federal Aviation Administration.

8 Claims, 8 Drawing Figures

CUSHIONING MEMBER

BACKGROUND OF THE INVENTION (1) Field of the Invention

The present invention relates to a cushioning member used for air-planes, ships, vehicles, furniture, and interior articles.

(2) Description of the Related Art

Fabrics, paddings and laminates formed by using inorganic compounds or organic compounds are used as materials having a heat-insulating or flame-proofing property. For example, there are known a wall covering material comprising an elastic air-permeable foam layer containing a flame-proofing additive and a fiber-containing covering layer, in which hollow granules of an inorganic material having independent cells are incorporated in continuous cells in the foam layer (see Japanese Unexamined Patent Publication No. 55-158384), and a furniture covering fabric having an improved flame-proofing property, which is a laminate of a fabric and a foam, wherein the foam layer comprises 100 parts by weight of a neoprene, about 5 to about 15 parts by weight of a carbonization promoter and about 10 to about 180 parts of alumina hydrate or the same amount, based on hydration water, of a hydrate of other inorganic compound, the inorganic compound hydrate retains the majority of the hydration water at temperatures for drying and curing the foam but loses hydration water at temperatures below about 500° C., the neoprene is a homopolymer of chloroprene or a copolymer of chloroprene with other organic monomers, and when the neoprene is a copolymer of chloroprene with acrylonitrile or an $\alpha$, $\beta$-saturated carboxylic acid, the carbonization promoter need not be present (see Japanese Unexamined Patent Publication No. 55-40890).

Recently, light-weight characteristic, easy moldability, and enhanced heat insulating property are required for a cushioning member comprising a heat insulating material such as mentioned above. For example, in connection with airplanes for which especially high heat insulating, flame-proofing, and light-weight characteristics are required, the FAA (Federal Aviation Administration) fireproof regulations for seat cushions of airplanes have been effective since Nov. 26, 1984, and it is stipulated that new regulations that cannot be satisfied by conventional products should be satisfied within three years from the above date.

SUMMARY OF THE INVENTION

Under this background, it is an object of the present invention to provide a cushioning member having light weight and easy moldability and also having heat insulating and flame-proofing characteristics capable of satisfying the FAA fireproof regulations.

In accordance with the present invention, there is provided a cushioning member comprising a cushioning layer, a heat insulating layer and a dress covering, the heat insulating layer being a laminate comprising (A) a flame-proofing layer and (B) a reinforcing layer, wherein the main fibers of the flame-proofing layer (A) have a melting point not lower than 300° C., a specific gravity not higher than 1.6 g/cm$^3$, and a limiting oxygen index (LOI) of at least 33, and the main fibers of the reinforcing layer (B) have a limiting oxygen index (LOI) smaller than 33 but not smaller than 25, a specific gravity not higher than 1.6 g/cm$^3$, a tensile strength of at least 3.2 g/d, and a toxicity test value of at least 10.

The toxicity test value used herein is the time (minutes) required for a mouse to die when the smoke generated by burning the fiber at 700° C. at an air feed rate of 11.4 l/min at an oxygen concentration of 21% by volume in the fed air is introduced into a box having a volume of 125 l in which the mouse is confined.

DESCRIPTION OF THE PREFERRED EMBODIMENTS

Figure 1:
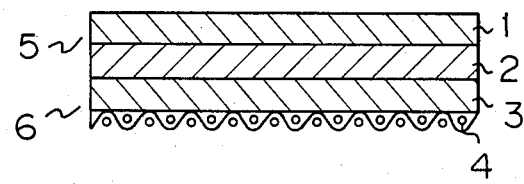
FIG. 1 is a sectional side view illustrating a heat insulating layer of the cushioning member of the present invention.
Figure 2:
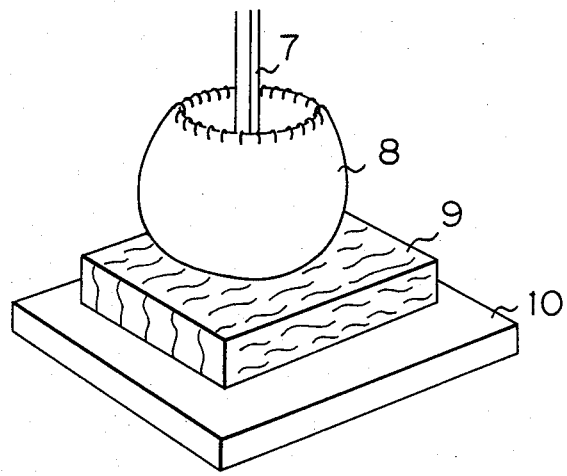
FIG. 2 is a perspective view illustrating an apparatus for testing the abrasion property.

The cushioning layer of the cushioning member of the present invention may be made of a known cushioning material For example, a polyurethane foam, a polystyrene foam, and foamed polyvinyl resins may be used.

The flame-proofing layer and reinforcing layer constituting the heat insulating layer of the cushioning member of the present invention are woven fabrics, non-woven fabrics, scrims, or networks composed of specific fibers or laminates thereof. The heat insulating layer of the cushioning member of the present invention is a laminate comprising (A) a flame-proofing layer and (B) a reinforcing layer.

The fiber constituting the flame-proofing layer (A) is a fiber having a melting point not lower than 300° C., a specific gravity not higher than 1.6 g/cm$^3$, and a limiting oxygen index (LOI) of at least 33. In connection with the melting point, there is included a fiber which is thermally decomposed and carbonized without substantial melting when exposed to a temperature not lower than 300° C. A fiber having a specific gravity not higher than 1.46 g/cm$^3$ and an LOI value of at least 40 is preferred. As the fiber having the above-mentioned properties, there can be mentioned, for example, a polybenzimidazole fiber (such as PBI supplied by Celanese Corp.), a flame-proofing fiber obtained by preoxidizing a polyacrylonitrile fiber to effect surface carbonization (such as Pyromex supplied by Toho Rayon K.K.), and a novoloid fiber (such as Kynol supplied by Nippon Kynol K.K.).

The fiber constituting the reinforcing layer (B) is a fiber having a limiting oxygen index (LOI) smaller than 33 but not smaller than 25, a specific gravity not higher than 1.6 g/cm$^3$, a tensile strength of at least 3.2 g/d, and a toxicity test value of at least 10 minutes. A fiber having a specific gravity not higher than 1.46 g/cm$^3$ and a tensile strength of at least 4.0 g/d, which is thermally decomposed and carbonized, as in case of the fiber constituting the flame-proofing layer, without substantial melting when exposed to a flame, is preferred. The toxicity test value referred to herein is the time (minutes) required for a mouse to die when the smoke generated by burning the fiber at 700° C. at an air feed rate of 11.4 l/min at an oxygen concentration of 21% by volume in the fed air is introduced into a box having a volume of 125 l in which the mouse is confined.

As specific examples of the fiber having the above-mentioned characteristics, there can be mentioned a poly-p-phenylene-terephthalamide fiber (such as Kevlar fiber supplied by Du Pont Co.), a poly-m-phenyleneisophthalamide fiber (TEIJINCONEX fiber supplied by Teijin Ltd.), a polychlal fiber, a polyester fiber subjected to the flame-retardant treatment, a rayon fiber subjected to the flame-retardant treatment, and an aromatic polyamide fiber comprising units of the following formulae (1), (2), and (3) (such as Polyetheramide fiber supplied by Teijin Ltd.):

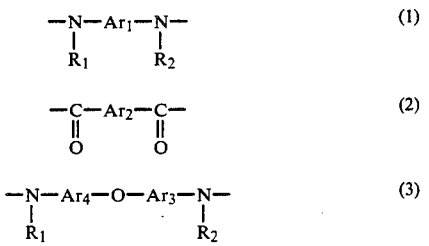

wherein $Ar_1$, $Ar_2$, and $Ar_3$, which may be the same or different, are an aromatic hydrocarbon ring residue having bonding chains oriented coaxially or in parallel, and $Ar_4$ and $Ar_5$, which may be the same or different, are a group selected from a p-phenylene group and a m-phenylene group.

As pointed out hereinbefore, the flame-proofing layer may be a woven fabric, a knitted fabric, a non-woven fabric, a scrim, or a network or a laminate thereof. In view of the simplicity of the manufacturing process and easy moldability, a layer containing a non-woven fabric is preferably used as the flame-proofing layer. A single layer of a non-woven fabric may be used as the layer containing a non-woven fabric, but a web laminate or a laminate of a woven or knitted fabric and a web is preferably used.

For integration of the flame-proofing layer with the reinforcing layer for forming a laminate, there may be used a bonding method using a heat-resistant adhesive resin, a heat-resistant and heat-fusible fiber or a heat-fusible powder. However, it is preferred that a laminate be prepared by integrating both the layers by interlacing by mechanical means such as needling.

The basic weights of the flame-proofing layer and reinforcing layer are at least 10 g/m², preferably the basic weight of at least one of the flame-proofing and reinforcing layers be at least 30 g/m². More preferably both the layers should have a basic weight of at least 30 g/m² and at least one of the two layers should have a basic weight of at least 50 g/m². However, in view of the light-weight characteristic of the cushioning member, it is preferred that the upper limit of the basic weight be not more than 700 g/m², especially not more than 500 g/m².

Any customarily used sidepieces may be used in the present invention, but it is preferred that a sidepiece composed of a material having high flame retardancy and flame proofness be used. For example, there may be used a fabric composed completely of wool, a fabric composed completely of wool and subjected to flame-proofing treatment, a fabric composed of a blended yarn comprising 10% of an aliphatic polyamide fiber and 90% of wool, a fabric composed of the same blended yarn and subjected to the flame-proofing treatment, a fabric composed completely of a modacrylic fiber, a fabric composed of a blended yarn of wool, a modacrylic fiber and a polychlal fiber, and a fabric composed of a poly-m-phenylene-isophthalamide fiber. A woven fabric is ordinarily used, but a knitted fabric, a non-woven fabric, or a laminate may be used.

The cushioning member of the present invention has a light-weight characteristic and an easy moldability and also has a very high heat-insulating property and a very high flame-proofing property. This cushioning member can satisfy the FAA flame-proofing regulations which conventional cushioning members fail to satisfy.

The present invention will now be described in detail with reference to the following examples. In the examples, the melting point, specific gravity, limiting oxygen index (LOI value), tensile strength, and toxicity test value were determined according to methods described below.

Melting Point

The melting point was determined from the position of the endothermic peak in the differential thermal analysis (DTA).

Specific Gravity

The specific gravity was measured according to the density gradient tube method.

Limiting Oxygen Index (LOI Value)

The limiting oxygen index was measured according to the method of JIS (Japanese Industrial Standard) K-7201-1972.

Tensile Strength

The tensile strength was measured according to the method of JIS L-1096.

Toxicity Test Value

Figure 3:
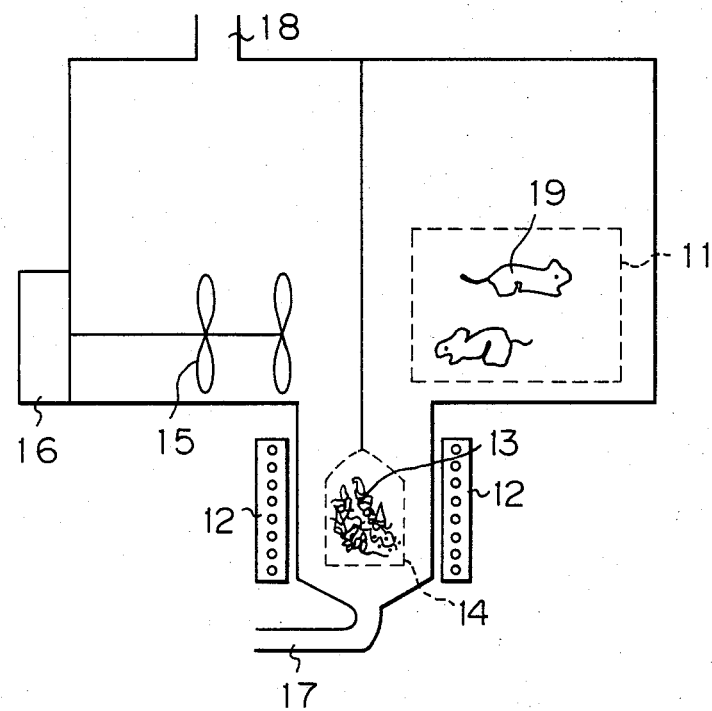
FIG. 3 is a sectional side view illustrating an apparatus for determining the toxicity test value.

The test apparatus shown in FIG. 3 was used.

The oxygen concentration in circulated air was 21% by volume and the temperature of an electric furnace was adjusted to 700° C., 2 g of a fiber sample was burnt and the generated smoke was introduced into a box having a volume of 125 l in which a mouse was confined. The time (minutes) of from the point of introduction of the smoke to the point of death of the mouse was measured and expressed as the toxicity test value. FIG. 3 is a sectional side view of the test apparatus, in which reference numeral 11 represents a mouse box, reference numeral 12 represents an electric furnace, reference numeral 13 represents a heat-insulating material according to the present invention, reference numeral 14 represents a test fiber-holding porous vessel, reference numeral 15 represents a fan, reference numeral 16 represents a fan motor, reference numeral 17 represents an air inlet, and reference numeral 18 represents an exhaust outlet.

Combustion Test

The combustion test was carried out according to the method given in FAA Regulations, Docket No. 23791, Notice No. 83-14 (Oct. 26, 1984) described below.

1. FAA Combustion Test Method

1.1 Test Sample

A polyurethane cushion is wrapped with a heat-insulating layer and is then covered with a sidepiece to form a seat cushion for an airplane.

(1) A bottom cushioning member on which the hip is placed has a width of 457±3 mm, a length of 508±3 mm, and a thickness of 102±3 mm.

(2) A back cushioning member has a width of 457±3 mm, a height of 635±3 mm, and a thickness of 51+3 mm.

1.2 Test Sample Supporting Stand

Figure 4:
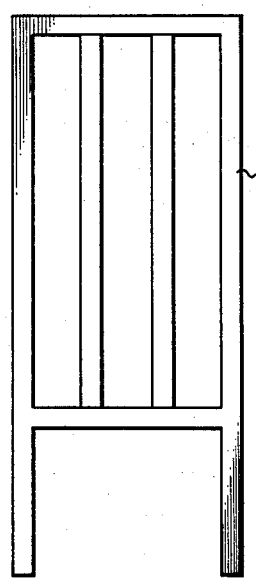
FIGS. 4 through 6 are front, side, and plane views of a stand for supporting a test sample for the combustion test.
Figure 5:
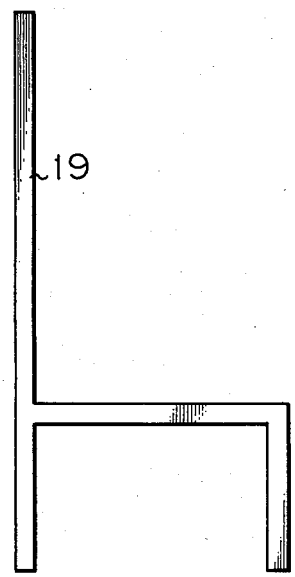
Figure 6:
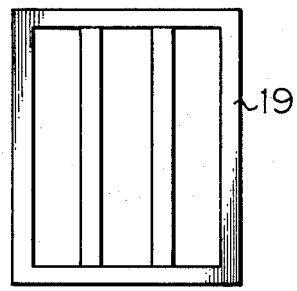

FIGS. 4, 5, and 6 show a steel stand for supporting a test sample (front, side, and plane views respectively). Reference numeral 19 represents a steel plate.

1.3 Setting of Test Sample

Figure 7:
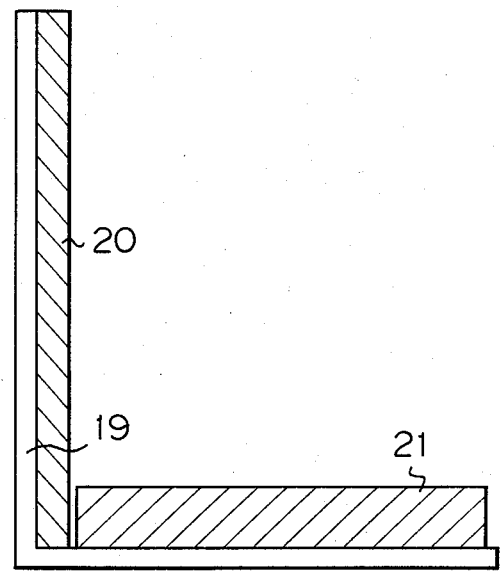
FIGS. 7 and 8 are side and plane views illustrating the setting of a test sample.
Figure 8:
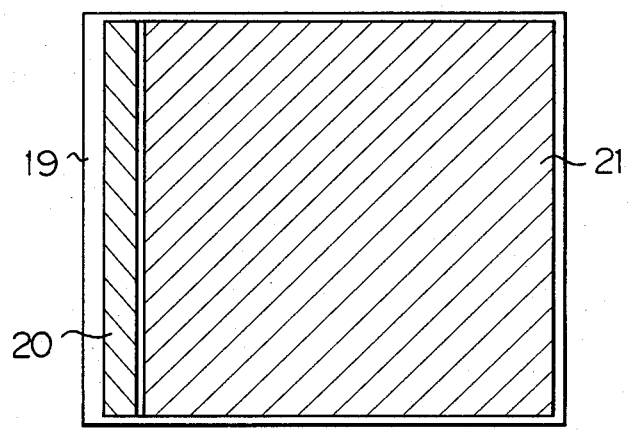

FIGS. 7 and 8 are side and plane views, respectively, illustrating setting of a test sample. The back cushion member 20 and bottom cushioning member 21 are set on the above-mentioned supporting steel stand as shown in FIGS. 7 and 8.

1.4 Burner (1) A conical burner such as Lennox Model 0B-32, Carlin Model 200CRD or Park Model DPL 3400 is used. The opening of burner has a height of 152 mm and a width of 280 mm.

(2) A nozzle capable of spraying a fuel at a rate of 2.25 gallons per hour under 100 psi is used.

(3) A fuel pressure adjuster is attached to the burner so that a grade #2 kerosine is supplied at a rate of 2.0 gallons per hour.

1.5 Weight Measuring Device

In order to measure the weight before and after the test, a measuring device capable of measuring the total weight of the sample supporting stand and the test sample is used.

1.6 Test Method (1) The sample is placed so that the distance between the side face end of the bottom cushioning member of the test sample and the burner end is 102±3 mm.

(2) The power of the burner is adjusted before setting of the sample, and the introduction rate of air into the burner is adjusted so that the quantity of heat at the flame-touching central part on the side face end of the cushioning member is 10.5±0.5 BTU/ft$^2$·sec (11.9±0.6 W/cm$^2$) and the temperature is 1038±38° C.

(3) The sample is placed under the conditions described in (2) above, and the sample is brought into contact with a flame of the burner for 2 minutes.

(4) The burner is turned off after 2 minutes, and after the elapsing of 5 minutes, the fire is put out by a $CO_2$ gas fire extinguisher to complete the test.

(5) The total weight of the sample supporting stand and the test sample is measured before and after the test, and the weight decrease ratio based on the weight of the test sample before the test is calculated.

(6) The carbonization length of the charred portion is measured.

(7) If the weight decrease ratio is not more than 10% and the carbonization length is not larger than 17 inches, it is judged that the sample has passed the test.

Abrasion Test

1. A polyurethane cushion seat customarily used for an airplane is wrapped with a heat insulating layer and is further wrapped with a dress cover customarily used for an airplane (for example, a woven fabric having a basis weight of 420 g/m$^2$ and being composed of a blended yarn comprising 90% wool and 10% nylon-66) to form a test cushioning body.

2. A human hip model portion of an abrasion test apparatus is clad in underpants of a 2B tricot texture composed completely of a polyethylene terephthalate fiber. The underpants are exchanged with new ones at intervals of 25 hours.

3. The test apparatus is driven in the following manner.

(1) The human hip model portion (weight: 63.5 Kg) is brought into contact with the cushioning member for 1 minute and 40 seconds and is then moved upward and kept out of contact with the cushioning member for 20 seconeds. Simultaneously with this vertical movement of one cycle per 2 minutes, the hip model portion is caused to make a rocking movement of 14 cycles per minute while drawing a circular arc of 12.3°.

(2) The test cushioning member is reciprocatively moved at 19.5 cycles per minute while drawing a circular arc of 19.2°.

(3) The above operations (1) and (2) are continuously carried out for 25, 50, 75 or 100 hours.

4. The dress cover is removed, and the surface condition and destruction state of the fire-blocking layer are checked.

EXAMPLE 1

A flame-proofing layer was formed by laminating a polybenzimidazole fiber non-woven fabric having a basis weight of 50 g/m$^2$ (PBI non-woven fabric) with a non-woven fabric of a flame-proofing fiber (Pyromex supplied by Toho Rayon K.K.) prepared by preoxidizing a polyacrylonitrile fiber having a basis weight of 50 g/m$^2$. Separately, a reinforcing layer was formed by laminating a non-woven fabric composed of a poly-m-phenyleneisophthalamide fiber (TEIJINCONEX, registered trademark, supplied by Teijin Ltd.) and having a basis weight of 50 g/m$^2$ Cornex, registered trademark, supplied by Teijin Ltd. with a plain weave fabric having a basis weight of 70 g/m$^2$, which was prepared by using spun yarns of the above TEIJINCONEX fiber as warps and wefts. The thus-obtained flame-proofing layer and reinforcing layer were laminated as shown in FIG. 1, and the laminate was needle-punched and integrated to form a needle felt heat-insulating layer. FIG. 1 is a sectional side view illustrating the heat-insulating layer, wherein reference numeral 1 represents a PBI non-woven fabric, reference numeral 2 represents a Pyromex non-woven fabric, reference numeral 3 represents a TEIJINCONEX non-woven fabric, and reference numeral 4 represents a TEIJINCONEX woven fabric. The results of the evaluation are shown in Table 1.

EXAMPLES 2 through 7

Cushioning members were prepared in the same manner as described in Example 1 except that fibers of the flame-proofing and reinforcing layers shown in Table 1 were combined and sidepieces shown in Table 1 were used. The results of the evaluation of these cushion members are shown in Table 1.

TABLE 1

| Example No. | Flame-proofing layer | Reinforcing layer | Basic weight (g/m²) | Combustion test (%) | Carbonization length (inch) of chair | Wearing property | Sidepiece | Toxicity test value (minute) |
|---|---|---|---|---|---|---|---|---|
| 1 | PBI web | | 50 | 9 | 10 | Not significant even after 100 hours | Wool woven fabric (420 g/m²) | >10 |
| | Pyromex web | | 50 | | | | | |
| | | TEIJINCONEX web | 50 | | | | | |
| | | Cornex woven fabric | 70 | | | | | |
| 2 | PBI web | | 100 | 9 | 11 | Not significant even after 100 hours | Wool woven fabric (420 g/m²) | " |
| | | TEIJINCONEX web | 200 | | | | | |
| | | TEIJINCONEX woven | 70 | | | | | |
| 3 | PBI web | | 50 | 5 | 8 | Not significant even after 100 hours | Flame-retardant TEIJINCONEX FR (280 g/m²) | " |
| | Pyromex web | | 50 | | | | | |
| | | TEIJINCONEX web | 50 | | | | | |
| | | TEIJINCONEX woven fabric | 70 | | | | | |
| 4 | PBI web | | 70 | 10 | 12 | Not significant even after 100 hours | TEIJINXONEX FR woven fabric (350 g/m²) | " |
| | | TEIJINCONEX web | 70 | | | | | |
| | | TEIJINCONEX woven fabric | 70 | | | | | |
| 5 | PBI web | | 70 | 5 | 8 | Not significant even after 100 hours | TEIJINCONEX FR woven fabric (280 g/m²) | " |
| | Kynol web | | 70 | | | | | |
| | | TEIJINCONEX web | 70 | | | | | |
| | | TEIJINCONEX woven fabric | 70 | | | | | |
| 6 | PBI web | | 80 | 9 | 10 | Not significant even after 100 hours | Wool woven fabric (420 g/m²) | " |
| | Kevlar web (mixed web) | | 50 | | | | | |
| | | TEIJINCONEX web | 70 | | | | | |
| | | TEIJINCONEX base fabric | 70 | | | | | |
| 7 | PBI web | | 80 | 7 | 9 | Not significant even after 100 hours | Wool woven fabric (420 g/m²) | " |
| | Pyromex web (mixed web) | | 50 | | | | | |
| | | TEIJINCONEX web | 50 | | | | | |
| | | PBI web (mixed web) | 10 | | | | | |
| | | TEIJINCONEX base fabric | 70 | | | | | |

*TEIJINCONEX: registered trademark, poly-m-phenylene-isophthalamide fiber supplied by Teijin Ltd.
TEIJINCONEX-FR: registered trademark, new type poly-m-phenylene-isophthalamide fiber having improved flame and melt resistance over conventional TEIJINCONEX.
PBI: trademark, polybenzimidazole fiber supplied by Celanese Corp.
Pyromex: registered trademark, surface-carbonized polyacrylonitrile fiber supplied by Toho Rayon K.K.
Kynol: registered trademark, polyphenol fiber supplied by Nippon Kynol K.K.
Kevlar: registered trademark, poly-p-phenyleneterephthalamide fiber supplied by E. I. DuPont Co.

Fibers used in the examples and comparative examples and properties thereof are shown in Table 2.

TABLE 2

| Fiber material | Specific gravity | Melting point (°C.) | LOI value | Toxicity test value (minute) | Tensile strength (g/d) |
|---|---|---|---|---|---|
| PBI | 1.40 | No | 41 | >10 | 3.1 |
| TEIJINCONEX | 1.38 | No | 30 | " | 5.5 |
| Pyromex | 1.40 | No | 55 | " | 2.0 |
| Polyacrylonitrile | 1.17 | No | 18 | 4 | 4.0 |
| Polypropylene | 0.91 | 170 | 19 | >10 | 5.0 |
| Kynol | 1.27 | No | 34 | " | 1.8 |
| Polyester | 1.38 | 255 | 21 | " | 5.5 |

COMPARATIVE EXAMPLES 1 THROUGH 9

Cushioning members were prepared in the same manner as described in Example 1 except that flame-proofing and, reinforcing layers were combined as shown in Table 3 and sidepieces shown in Table 3 were used. In Comparative Examples 1 through 4, the flame-proofing and reinforcing layers were not distinguished from each other but a mixed layer (mixed felt) composed of fibers for the flame-proofing layer and fibers for the reinforcing layer was formed. The results of evaluation are shown in Table 3.

TABLE 3

| Comparative Example No. | Flame-proofing layer | Reinforcing layer | Basis weight (g/m²) | Combustion Test (%) | Carbonization length (inch) of chair | Wearing property | Dress cover | Toxicity Test Value (minute) |
|---|---|---|---|---|---|---|---|---|
| 1 | PBI web | | 50 | 11 | 14 | partially holed in | wool woven fabric (420 g/m²) | >10 |
| | Pyromex web | | 50 | | | | | |
| | | TEIJINCONEX web | 50 | | | | | |
| | | TEIJINCONEX woven fabric | 70 | | | | | |
| 2 | PBI web | | 100 | 12 | 16 | Not significant even after 100 hours | wool woven fabric (420 g/m²) | " |
| | | TEIJINCONEX web | 200 | | | | | |
| | | TEIJINCONEX woven fabric | 70 | | | | | |
| 3 | PBI web | | 70 | 14 | 17 | Not significant even | Cornex FR Woven fabric | " |
| | | TEIJINCONEX web | 70 | | | | | |

TABLE 3-continued

| Comparative Example No. | Flame-proofing layer | Reinforcing layer | Basis weight (g/m²) | Combustion Test (%) | Carbonization length (inch) of chair | Wearing property | Dress cover | Toxicity Test Value (minute) |
|---|---|---|---|---|---|---|---|---|
|  |  | TEIJINCONEX woven fabric | 70 |  |  | after 100 hours |  |  |
| 4 | PBI web |  | 70 | 10 | 13 | Partially holed in 50 hours | Cornex FR (280 g/m²) | " |
|  | TEIJINCONEX web |  | 70 |  |  |  |  |  |
|  | Kynol web |  | 70 |  |  |  |  |  |
|  |  | TEIJINCONEX woven fabric | 70 |  |  |  |  |  |
| 5 | Polyester web |  | 100 | More than 15 | More than 17 | Not significant even after 100 | Wool woven fabric (420 g/m²) | " |
|  |  | TEIJINCONEX web | 50 |  |  |  |  |  |
|  |  | TEIJINCONEX woven fabric | 70 |  |  |  |  |  |
| 6 | PBI web |  | 100 | More than 15 | More than 17 | Not significant even after 100 | Wool woven fabric (420 g/m²) | 4 |
|  |  | Polyacrylonitrile web | 200 |  |  |  |  |  |
|  |  | TEIJINCONEX woven fabric | 70 |  |  |  |  |  |
| 7 | PBI web |  | 100 | More than 15 | More than 17 | Not significant even after 100 | Wool woven fabric (420 g/m²) | More than 10 |
|  |  | Polypropylene web | 200 |  |  |  |  |  |
|  |  | TEIJINCONEX woven fabric | 70 |  |  |  |  |  |
| 8 | Kevlar |  | 100 | 13 | 16 | Not significant even after 100 | Wool woven fabric (420 g/m²) | More than 10 |
|  |  | TEIJINCONEX web | 50 |  |  |  |  |  |
|  |  | TEIJINCONEX base fabric | 70 |  |  |  |  |  |
| 9 | PBI web |  | 50 | 11 | 12 | Not significant even after 100 | Wool woven fabric (420 g/m²) | More than 10 |
|  | Kevlar web (mixed web) |  | 80 |  |  |  |  |  |
|  |  | TEIJINCONEX web | 70 |  |  |  |  |  |
|  |  | TEIJINCONEX base fabric | 70 |  |  |  |  |  |

We claim:

1. A cushioning member comprising a cushioning layer, a heat insulating layer and a dress covering, said heat insulating layer being a laminate comprising (A) a flame-proofing layer and (B) a reinforcing layer, wherein the main fibers of the flame-proofing layer (A) have a melting point of at least 300° C., a specific gravity not higher than 1.6 g/cm³, and a limiting oxygen index (LOI) of at least 33 and the main fibers of the reinforcing layer (B) have a limiting oxygen index (LOI) smaller than 33 but not smaller than 25, a specific gravity not higher than 1.6 g/cm³, a tensile strength of at least 3.2 g/d, and a toxicity test value of at least 10, said toxicity test value being the time (minutes) required for a mouse to die when the smoke generated by burning the fiber at 700° C. at an air feed rate of 11.4 l/min at an oxygen concentration of 21% by volume in the fed air is introduced into a box having a volume of 125 l in which the mouse is confined.

2. A cushioning member according to claim 1 wherein the main fibers of the flame-proofing layer (A) have a specific gravity not higher tha 1.46 and an LOI value of at least 40.

3. A cushioning member according to claim wherein the main fibers of the reinforcing layer (B) have a specific gravity not higher than 1.46 and a tensile strength of at least 4.0 g/d.

4. A cushioning member according to claim 1 wherein each of the flame-proofing layer and the reinforcing layer comprises a non-woven fabric.

5. A cushioning member according to claim 1 wherein said laminate of the flame-proofing layer are formed and the reinforcing layer by mechanical means.

6. A cushioning member according to claim 1 wherein the flame-proofing layer and the reinforcing layer have basic weights of 10 to 700 g/m² and at least one of these two layers has a basic weight of at least 30 g/m².

7. A cushioning member according to claim 1 wherein the flame-proofing layer and the reinforcing layer have basic weights of 30 to 500 g/m² and at least one of these two layers has a basic weight of at least 50 g/m².

8. The cushioning member of claim 5 wherein said laminate is prepared by interlacing the flameproofing layer and the reinforcing layer.

* * * * *